United States Patent [19]

Nagano

[11] Patent Number: 4,594,910
[45] Date of Patent: Jun. 17, 1986

[54] GEAR CRANK FOR A BICYCLE

[75] Inventor: Masashi Nagano, Izumi, Japan

[73] Assignee: Shimano Industrial Company Limited, Osaka, Japan

[21] Appl. No.: 629,114

[22] Filed: Jul. 9, 1984

[30] Foreign Application Priority Data

Jul. 11, 1983 [JP] Japan .......................... 58-108203[U]

[51] Int. Cl.⁴ .............................................. G05G 1/14
[52] U.S. Cl. ................................... 74/594.2; 74/594.1
[58] Field of Search ........................... 74/594.1, 594.2

[56] References Cited

FOREIGN PATENT DOCUMENTS

| 1020997 | 6/1950 | France | 74/594.1 |
|---------|--------|--------|----------|
| 1271984 | 11/1959 | France | 74/594.2 |
| 326458 | 5/1935 | Italy | 74/594.2 |
| 15419 | of 1902 | United Kingdom | 74/594.2 |

*Primary Examiner*—Kenneth J. Dorner
*Assistant Examiner*—Rodney M. Lindsey

*Attorney, Agent, or Firm*—Stevens, Davis, Miller & Mosher

[57] ABSTRACT

A gear crank for a bicycle includes a plurality of chain gears mounted to stays disposed radially outwardly with respect to a crank shaft. The stays include four main stays arranged in pairs. The two main stays forming each pair are disposed at a relative phase difference of about 180°. Two short auxiliary stays are disposed between the pairs of main stays and have mounting portions for the larger diameter chain gears. The pairs of main stays intersect at a non-90° angle so that an angle between the pairs of main stays is larger than that between the main stays forming each pair. The stays are fixed to the crank to position the crank arms between the pairs of stays within a region defined by the above-described larger angle respectively. Connecting segments extending circumferentially and supporting the auxiliary stays are provided between the auxiliary stays and the main stays adjacent thereto respectively.

4 Claims, 4 Drawing Figures

FIG. 3
FIG. 4
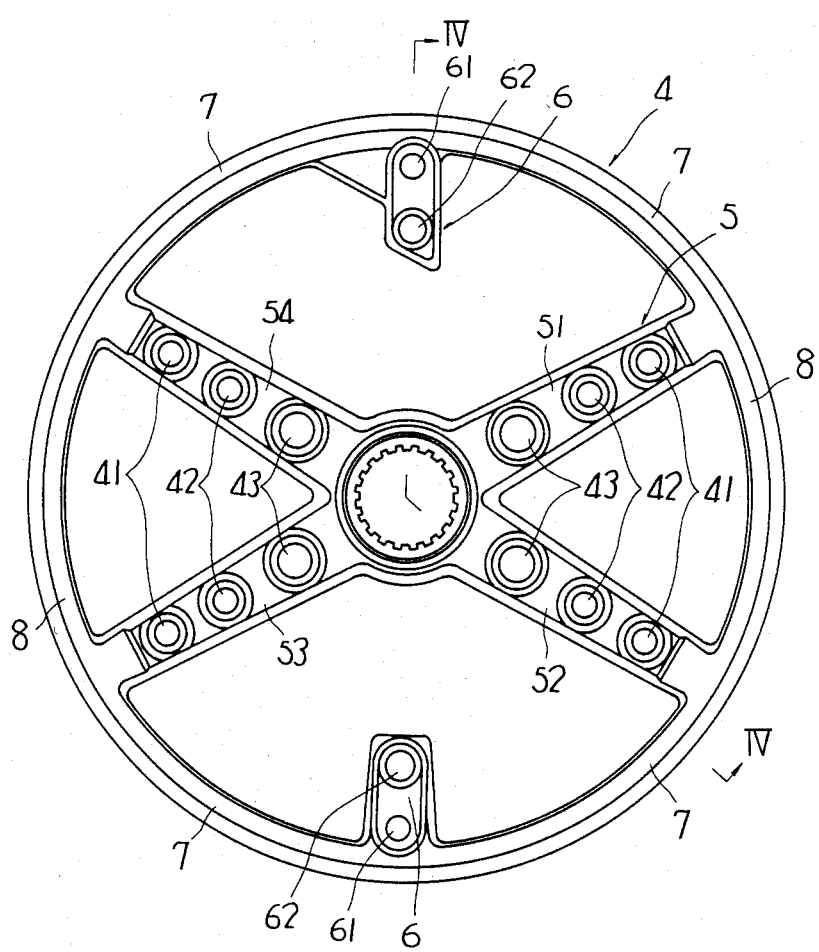
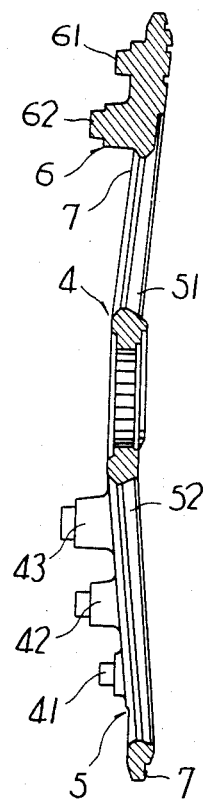

GEAR CRANK FOR A BICYCLE

FIELD OF THE INVENTION

This invention relates to a gear crank for a bicycle, and more particularly to a gear crank for a bicycle, comprising a plurality of chain gears and a crank means having a crank shaft and a pair of crank arms, the chain gears being adapted to be mounted to a plurality of stays disposed radially outwardly with respect to the crank shaft.

BACKGROUND OF THE INVENTION

Conventionally, bicycle gear cranks include an adapter having five or six stays spaced at regular angular intervals therebetween and fixed to the crank arm or crank shaft and a plurality of chain gears mounted to the stays so that a driving force produced by pedalling is transmitted from the stays to a driving chain through the chain gear.

Such stays, however, are disposed regardless of location of each crank arm, whereby at least five or six stays are used.

Hence, the conventional gear crank has a weight corresponding to the number of stays, which has been a defect for the bicycle demanded to be lightweight.

SUMMARY OF THE INVENTION

Base on the principle that the driving force caused by pedalling varies corresponding to an angular phase of each crank arm such that the driving force is the minimum when the crank arms are positioned at the vertical dead points or in the vicinity thereof, and is the maximum when each crank arm is displaced at the predetermined angle (usually 70° to 130°) ahead of the upper dead point, this invention has been designed to use four stays.

In other words, the present invention utilizes the driving force varying as abovementioned and takes into consideration the positional relation between the crank arm and the stay, thereby using four stays.

An object of the invention is to provide a gear crank having stays less in number for reducing weight and supportable of the chain gears stably even when the larger diameter gear and smaller diameter one differ largely in their number of teeth. This invention is characterized in that four main stays in two pairs are disposed such that the two main stays forming a pair have a phase difference of about 180°. The pairs of main stays intersect at a non-90 angle so that an angle between each pair of main stays is larger than that between the stays in each pair. The main stays are fixed to the crank means so that each crank arm is positioned between each pair of stays within the region defined by the aforesaid larger angle, and two short auxiliary stays having mounting portions for the larger diameter chain gears are disposed between each pair of main stays and are supported with connecting segments extending circumferentially from the utmost ends of adjacent stays.

In other words, this invention provides for each pair of main stays disposed as above mentioned to be positioned in a region where the larger driving force is transmitted reliably from the crank arm to the chain gear, and the aforesaid auxiliary stays support the larger diameter chain gears at the positions thereof between the main stays, in other words, in the positions corresponding to the vertical dead points of crank arms, thereby making the gear crank lightweight as a whole and enabling stable support of each chain gear.

These and other objects of the invention will become more apparent in the detailed description and examples which follow.

BRIEF DESCRIPTION OF THE DRAWINGS

FIG. 3 a rear view of an adapter only, and

FIG. 4 is a sectional view taken on the line IV—IV in FIG. 3.

DETAILED DESCRIPTION OF THE INVENTION

Figure 1:
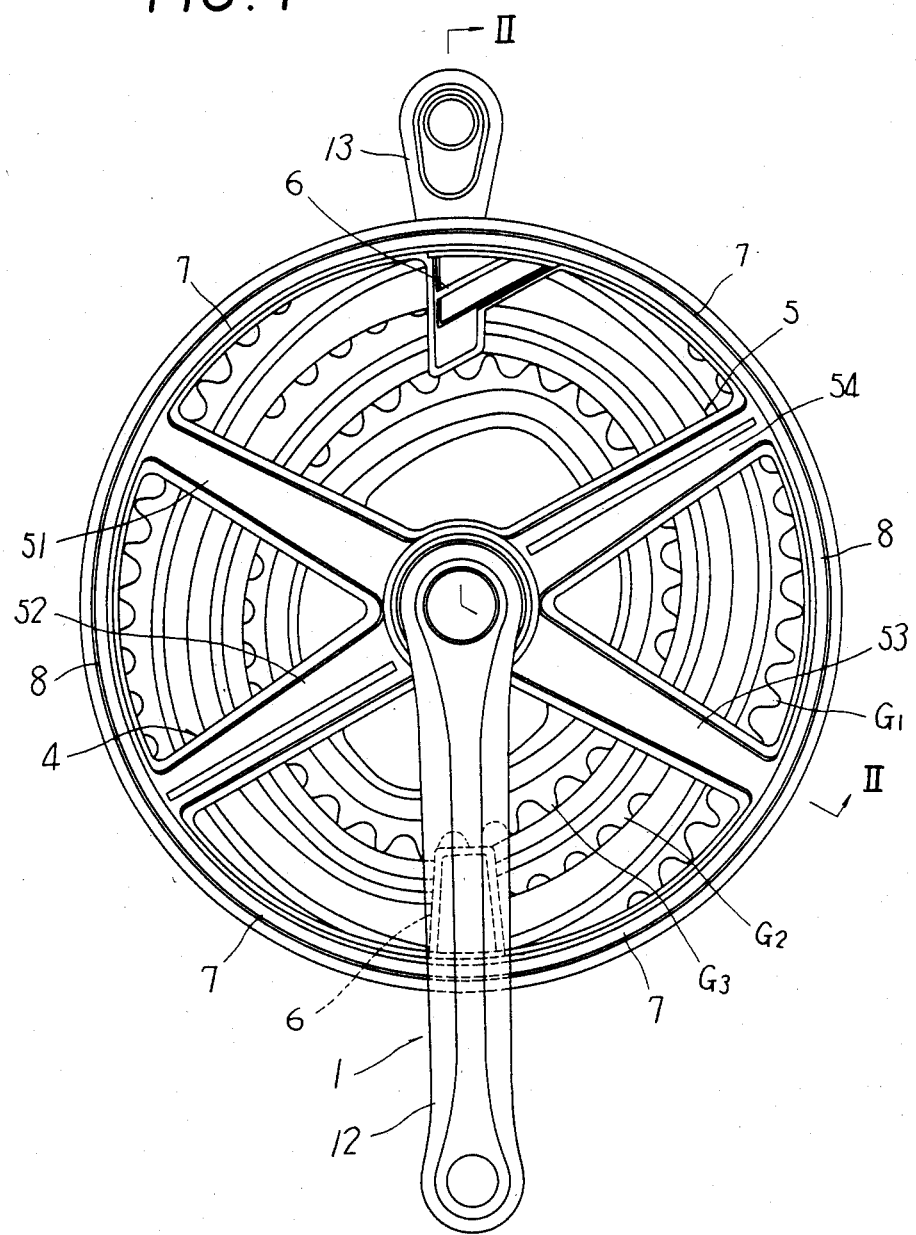
FIG. 1 is a front view of an embodiment of a gear crank of the invention.
Figure 2:
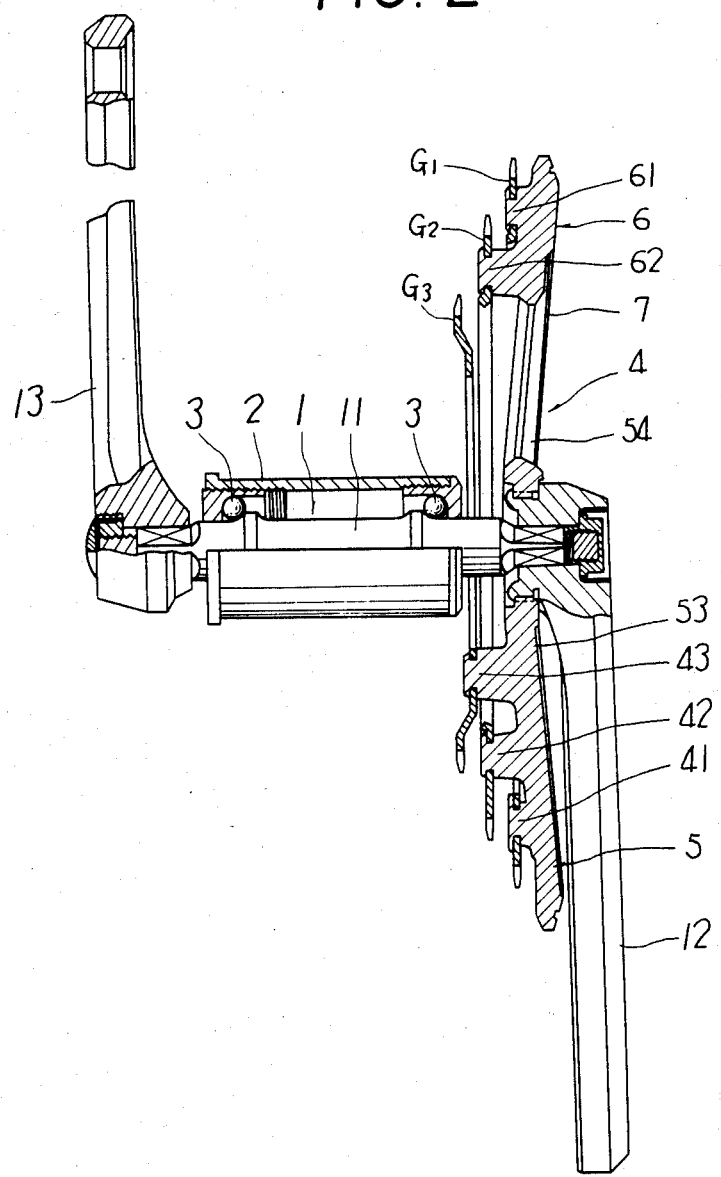
FIG. 2 is a sectional view taken on the line II—II in FIG. 1.

Referring to FIGS. 1 and 2, the gear crank comprises three chain gears $G_1$ to $G_3$ not-round and approximately elliptic in shape and different in the number of teeth and of larger, middle and smaller diameters respectively. The gear crank includes a crank 1 comprising three pieces of a crank shaft 11 and a pair of first and second crank arms 12 and 13, the gears $G_1$ to $G_3$ being assembled with the crank shaft 11 through an adapter 4 having a stay means 5 extending radially outwardly of crank shaft 11.

The crank shaft 11 is supported rotatably to a bottom bracket of the bicycle through bearings 3 and the first and second crank arms 12 and 13 are fixed at the roots to the crank shaft 11 opposite to each other, the adapter 4 being fixed to the root of first crank arm 12 by a fixing means, such as caulking.

The stay means 5 comprises four main stays 51 to 54 in two pairs each disposed at a phase difference of about 180° and symmetrically around the crank shaft 11 and two short auxiliary stays 6 disposed between each pair and having mounting portions 61 and 62 for the larger diameter chain gear $G_1$ and middle diameter one $G_2$. Angles between the stays 51 and 54, and 52 and 53, are made larger than those between the stays 51 and 52, and 53 and 54. Stays 51 to 54 are fixed to the crank means 1 so that the first and second crank arms are positioned between the stays 52 and 53 and between stays 51 and 54 respectively. Connecting segments 7 extending circumferentially of adapter 4 are provided between each auxiliary stay 6 and the stays 51 and 54 adjacent thereto and between the same and those 52 and 53 adjacent thereto and support the auxiliary stays 6 respectively.

In the drawings, the stays 51 and 52 are disposed at an angle of about 60° therebetween and those 53 and 54 are disposed at the same angle therebetween and symmetrically with the stays 51 and 52 respectively. The respective stays 51 to 54 are provided at the side surface opposite to the second crank arm 13 with projecting mounting portions 41, 42 and 43 for the larger, middle and smaller diameter chain gears $G_1$, $G_2$ and $G_3$. Projecting mounting portions 41–43 are disposed radially inwardly in a stepped manner.

Each crank arm 12 or 13 is positioned at approximately an intermediate portion of an angle of about 120° between the stays 51 and 54 or 52 and 53 so that when crank arm 12 or 13 reaches the forward rotation position where a cyclist produces the maximum driving force, each pair of stays 51 and 52 or 53 and 54 are directed upwardly to transmit the maximum driving force to the driving chain.

The respective stays 51 to 54 are inclined radially rearwardly and in the direction reverse to the projecting mounting portions 41 to 43. The chain gear mounting positions at the mounting portions 41 to 43 are set perpendicular with respect to the crank shaft 11 to thereby restrain the occurrence of a twist, in turn it is reduced in axial length to contribute to a decrease in weight of stay. It is preferable that between the utmost ends of the respective stays 51 to 54 are provided reinforcements 8 connecting therebetween, which are not indispensable.

Each auxiliary stay 6 is provided at an about intermediate portion between the stays 51 and 54 and between those 52 and 53 and sufficiently long to provide mounting portions 61 and 62 and to support the connecting portions 7 respectively.

The chain mounting portions 61 and 62 at each auxiliary stay 6 are provided at the position opposite to both the larger diameter chain gears $G_1$ and $G_2$ and are arranged radially of adapter 4 in a stepped manner.

The connecting segments 7 for supporting the auxiliary stays 6 are preferably ring-like shaped together with the reinforcements 8, thereby reinforcing the stays 51 to 54 with each other.

The chain gears $G_1$ and $G_2$ are mounted to the mounting portions 61 and 62 so that when the crank arms 12 and 13 reach the vertical rotation positions when the cyclist produces the minimum driving force, one auxiliary stay 6 is positioned upwardly, thereby transmitting the minimum driving force from the larger diameter chain gear $G_1$ or middle diameter one $G_2$ to the driving chain through the slantwise upward stays 51 and 54, upper connecting segments 7, and auxiliary stay 6.

The chain gears $G_1$, $G_2$ and $G_3$ each are approximately elliptic of a smaller pitch diameter portion and a larger pitch diameter portion, and are assembled in the adapter 4 so that when the cyclist's foot produces the maximum torque by pedalling, the gear diameters of gears $G_1$, $G_2$ and $G_3$ become nearly the minimum and when the torque is the minimum, the gear diameter become nearly the maximum.

In other words, in the region where the maximum torque is obtained, the gear diameter is reduced to increase the circumferential speed of pedalling to match with the speed pattern of the cyclist's foot movement in the aforesaid region and to improve power (torque X speed). In the region where the minimum torque only is obtained, that is, in the vicinity of vertical dead points of crank arms 12 and 13, the gear diameter increases to reduce the circumferential speed of pedalling and matches with the speed pattern by the cyclist's foot at the aforesaid region, thereby improving the power as a whole, reducing muscular output (energy consumption), lightening a cyclist's physical load, and enabling smooth pedalling.

More particularly as shown in FIG. 1, the maximum gear diameter portions are disposed in the vicinity of the upper and lower dead points corresponding to the maximum gear diameter portions. The minimum gear diameter portions are disposed at the region producing the maximum torque. The maximum gear diameter portions near the upper and lower dead points are mounted to the auxiliary stays 6, and the minimum gear diameter portions are mounted to the stays 51, 52, 53 and 54 respectively. As a result, the maximum torque is transmitted to the minimum gear diameter portions through the stays 51 to 54 and the minimum torque is transmitted to the maximum gear diameter portions through the auxiliary stays 6.

The stays 51 to 54 constructed as abovementioned are reinforced with each other by the connecting segments 7 thereby being lightweight. The connecting segments 7, which need only transmit the minimum torque output by the cyclist to the chain gear through the auxiliary stays 6, are small-sized and lightweight, thus reducing the weight of adapter 4 along with reduction in the number of stays. The respective gears $G_1$ to $G_3$ are supported to four stays 51 to 54 for transmitting the maximum driving force and the larger and middle diameter gears $G_1$ and $G_2$ are supported at the maximum gear diameter portions thereof by the auxiliary stays 6. Hence, the chain gears $G_1$ to $G_3$ are supported stably and can always transmit the driving force to the driving chain. Accordingly, the gear crank is lightweight as a whole, the auxiliary stays each need only support the maximum gear diameter portion, thereby being reduced in length to a minimum and also made lightweight, thus giving a neat appearance.

Alternatively, the auxiliary stays may support the larger diameter chain gear $G_1$ only. Also, a round chain gear may of course be useable and the not number of geare need be limited to three.

As seen from the above, the gear crank of the invention constructed as abovementioned reinforces the stays with the connecting segments supporting the auxiliary stays and, along with reduction in the number of stays, the stays are made lightweight thereby supporting stably the chain gears and transmitting always reliably the driving force to the driving chain.

While a preferred embodiment of the invention has been described using specific terms, such description is for illustrative purpose only, and it is to be understood that changes and variations may be made without departing from the spirit or scope of the following claims.

What is claimed is:

1. A gear crank comprising a plurality of chain gears and a crank having a crank shaft and a pair of crank arms, said chain gears being mounted to a plurality of stay members disposed radially outwardly with respect to said crank shaft, said stay members comprising four main stays which are arranged in first and second pairs, each pair including two main stays, each main stay being disposed at a phase difference of about 180° relative to a respective main stay of the other pair, said pairs being disposed symmetrically relative to each other around said crank shaft, each main stay having a mounting portion for each of said chain gears; said stay members further comprising two auxiliary stays each disposed between said pairs of said main stays on radially opposite sides relative to said crank shaft and having mounting portions for at least a largest diameter chain gear of said chain gears; the two main stays in each said pair of main stays intersecting at a non-90° angle such that an angle between said pairs of main stays is larger than an angle between said two main stays forming each said pair, said crank arms being disposed between said pairs of main stays within a region defined by said larger angle on radially opposite sides relative to said crank shaft, said gear crank further comprising connecting segments for supporting said auxiliary stays and extending circumferentially of said chain gear, each connecting segment being disposed between a said auxiliary stay and a said main stay adjacent thereto.

2. A gear crank for a bicycle according to claim 1, further comprising reinforcing segments each disposed between said two main stays forming each said pair of said main stays and extending circumferentially of said chain gear, said connecting segments and reinforcing segments being connected in a ring-like shape.

3. A gear crank for a bicycle according to claim 1, wherein said chain gears each are substantially elliptic in shape and have smaller pitch diameter portions and larger pitch diameter portions, said chain gears being disposed relative to said crank arms so that when a cyclist's foot generates a maximum torque during pedalling, a minimum gear diameter portion of each of said chain gears is approximately vertical, and when said torque generated during pedalling is a minimum, a maximum gear diameter portion of each of said chain gears is approximately vertical.

4. A gear crank for a bicycle according to claim 1, wherein each said connecting segment connects a main stay of one of said pairs of main stays with an adjacent main stay of the other of said pairs of main stays and said auxiliary stays are supported at a circumferential intermediate portion of respective said connecting segments, said auxiliary stays extending toward said crank shaft.

* * * * *